(12) United States Patent
Suzuki et al.

(10) Patent No.: US 11,177,077 B2
(45) Date of Patent: Nov. 16, 2021

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Shinya Suzuki, Kyoto (JP); Masahiro Kajimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/649,607

(22) PCT Filed: Oct. 5, 2018

(86) PCT No.: PCT/JP2018/037380
§ 371 (c)(1),
(2) Date: Mar. 20, 2020

(87) PCT Pub. No.: WO2019/087692
PCT Pub. Date: May 9, 2019

(65) Prior Publication Data
US 2020/0273628 A1    Aug. 27, 2020

(30) Foreign Application Priority Data
Oct. 31, 2017   (JP) .............................. JP2017-211225

(51) Int. Cl.
*H01G 9/15* (2006.01)
*H01G 9/00* (2006.01)
(Continued)

(52) U.S. Cl.
CPC ............ *H01G 9/15* (2013.01); *H01G 9/0032* (2013.01); *H01G 9/042* (2013.01); *H01G 9/055* (2013.01); *H01G 9/10* (2013.01)

(58) Field of Classification Search
CPC ........ H01G 9/15; H01G 9/0032; H01G 9/042; H01G 9/055; H01G 9/10
See application file for complete search history.

(56) References Cited

U.S. PATENT DOCUMENTS 5,716,420 A * 2/1998 Kuriyama ................ H01G 9/15
29/25.03
6,392,869 B2 * 5/2002 Shiraishi ................ H01G 9/012
361/523

(Continued)

FOREIGN PATENT DOCUMENTS

CN   102763182 A   10/2012
CN   107026019 A    8/2017
(Continued)

OTHER PUBLICATIONS

International Search Report of PCT application No. PCT/JP2018/037380 dated Jan. 8, 2019.
(Continued)

*Primary Examiner* — Dion Ferguson
(74) *Attorney, Agent, or Firm* — McDermott Will & Emery LLP

(57) ABSTRACT

An electrolytic capacitor includes a capacitor element, an exterior body that seals the capacitor element, and an external electrode. The capacitor element includes an anode foil, a dielectric layer, and a cathode part. The anode foil includes an anode lead-out part and a cathode forming part. The anode lead-out part has a first end of the anode foil. The cathode forming part has a second end of the anode foil. The dielectric layer is disposed on a surface of the cathode forming part. The cathode part covers at least part of the dielectric layer. The first end in the anode lead-out part protrudes from an end surface of the exterior body. At least part of the first end is in contact with the external electrode.

9 Claims, 2 Drawing Sheets

(51) Int. Cl.
*H01G 9/042* (2006.01)
*H01G 9/055* (2006.01)
*H01G 9/10* (2006.01)

(56) References Cited

U.S. PATENT DOCUMENTS

| | | | |
|---|---|---|---|
| 6,771,488 B2 * | 8/2004 | Takagi | H01G 9/012 |
| | | | 361/509 |
| 9,978,531 B2 * | 5/2018 | Kimura | H01G 9/15 |
| 2002/0001169 A1 * | 1/2002 | Shiraishi | H01G 9/012 |
| | | | 361/523 |
| 2002/0097550 A1 * | 7/2002 | Shimada | H01G 9/15 |
| | | | 361/532 |
| 2003/0026064 A1 | 2/2003 | Nakada et al. | |
| 2011/0149477 A1 | 6/2011 | Summey et al. | |
| 2017/0140877 A1 * | 5/2017 | Kuromi | H01G 9/10 |
| 2019/0244765 A1 * | 8/2019 | Harada | H01G 9/012 |

FOREIGN PATENT DOCUMENTS

| | | |
|---|---|---|
| JP | 2003-086459 | 3/2003 |
| JP | 2013-515381 | 5/2013 |
| JP | 2017-098297 | 6/2017 |

OTHER PUBLICATIONS

English Translation of Chinese Office Action dated Apr. 1, 2021 for the related Chinese Patent Application No. 201880068495.8.

* cited by examiner

ELECTROLYTIC CAPACITOR AND METHOD FOR MANUFACTURING SAME

TECHNICAL FIELD

The present invention relates to an electrolytic capacitor and a method for manufacturing the electrolytic capacitor.

BACKGROUND

An electrolytic capacitor includes a capacitor element, an exterior body that seals the capacitor element, and an external electrode electrically connected with an anode of the capacitor element. The capacitor element includes an anode foil, a dielectric layer, and a cathode part. The anode foil includes an anode lead-out part and a cathode forming part. The anode lead-out part has a first end of the anode foil. The cathode forming part has a second end of the anode foil. The dielectric layer is disposed on a surface of the cathode forming part. The cathode part covers at least part of the dielectric layer. To electrically connect the anode lead-out part with the external electrode, the first end exposed from the exterior body may be electrically connected with the external electrode.

Unexamined Japanese Patent Publication No. 2003-86459 discloses an electrolytic capacitor that includes an anode and/or a lead whose surface is formed to be uneven so that a connecting area of the surface of the anode and/or the lead to an anode terminal is increased. Consequently, contact resistance between them is decreased.

SUMMARY

Usually, a surface of the anode foil (an anode lead-out part and a cathode forming part) is roughened by etching. The anode lead-out part and the cathode forming part each have a core, and a porous body (porous part) formed on a surface of the core. To connect the anode lead-out part with an external electrode, each of the core and the porous part of the anode lead-out part is joined to the external electrode.

However, joint strength between the porous part and the external electrode is lower than joint strength between the core and the external electrode. Thus, it is difficult to increase joint strength between the anode lead-out part and the external electrode. Further, the porous part is less tightly joined to the external electrode. Thus, air (oxygen and water) may enter the electrolytic capacitor through an interface between the porous part and the external electrode. Consequently, for example, air that enter the electrolytic capacitor may reach a cathode part to cause a solid electrolyte layer of the cathode part deteriorate. Hence, an equivalent series resistance (ESR) of the electrolytic capacitor may increase.

An aspect of the present invention relates to an electrolytic capacitor that includes a capacitor element, an exterior body, and an external electrode. The capacitor element includes an anode foil, a dielectric layer, and a cathode part. The anode foil includes an anode lead-out part and a cathode forming part. The anode lead-out part has a first end of the anode foil, and the cathode forming part has a second end of the anode. The dielectric layer is disposed on a surface of the cathode forming part. The cathode part covers at least part of the dielectric layer. The exterior body seals the capacitor element. The first end in the anode lead-out part protrudes from an end surface of the exterior body. At least part of the first end is in contact with the external electrode.

Another aspect of the present invention relates to a method for manufacturing an electrolytic capacitor. The method includes first to fifth steps. The first step is forming a capacitor element that includes: an anode foil including an anode lead-out part and a cathode forming part; a dielectric layer disposed on a surface of the cathode forming part; and a cathode part covering at least part of the dielectric layer. The second step is covering the capacitor elements with an exterior body. The third step is cutting the exterior body together with the anode lead-out part to form a first end in the anode lead-out part, the first end having an end surface exposed from a cutting surface of the exterior body. The fourth step is allowing the first end to protrude from an end surface of the exterior body by removing part of the exterior body exposed at the cutting surface of the exterior body. The fifth step is joining the first end that protrudes from the exterior body to an external electrode.

The present invention can increases reliability of an electrolytic capacitor in which a first end in an anode lead-out part of an anode foil is exposed from an exterior body.

DESCRIPTION OF EMBODIMENT

An electrolytic capacitor according to an exemplary embodiment of the present invention includes a capacitor element, an exterior body that seals the capacitor elements, and an external electrode. The capacitor element includes an anode foil, a dielectric layer, and a cathode part. The anode foil includes an anode lead-out part and a cathode forming part. The anode lead-out part has a first end of the anode foil. The cathode forming part has a second end of the anode foil. The dielectric layer is disposed on a surface of the cathode forming part. The cathode part covers at least part of the dielectric layer. The first end in the anode lead-out part protrudes from an end surface of the exterior body. At least part of the first end is in contact with the external electrode.

Since the anode lead-out part protrudes from the end surface of the exterior body, the anode lead-out part of the electrolytic capacitor is securely joined to the external electrode of the electrolytic capacitor. Since the anode lead-out part is tightly joined to the external electrode, the anode lead-out part is reliably connected with the external electrode. Further, the external electrode is less likely to peel off the exterior body.

Preferably, at least part of a roughened portion of the first end in the anode lead-out part is removed. Each of a surface of the anode lead-out part and a surface of the cathode forming part of the capacitor element is roughened. Thus, a porous body (porous part) may be formed on a surface of the anode lead-out part close to the first end. Even in this case, since the porous part does not exist in a joining part between the anode lead-out part and the external electrode, the anode lead-out part is securely joined to the external electrode. The roughened portion of the first end in the anode lead-out part can be removed as follows, for example. First, the capacitor element is covered with the exterior body. Then, the exterior body is cut to expose the first end of the anode lead-out part from the exterior body. Consequently, the roughened portion of the first end in the anode lead-out part, which has been exposed from the exterior body, is removed by abrasive blasting treatment that will be described later.

Figure 2:
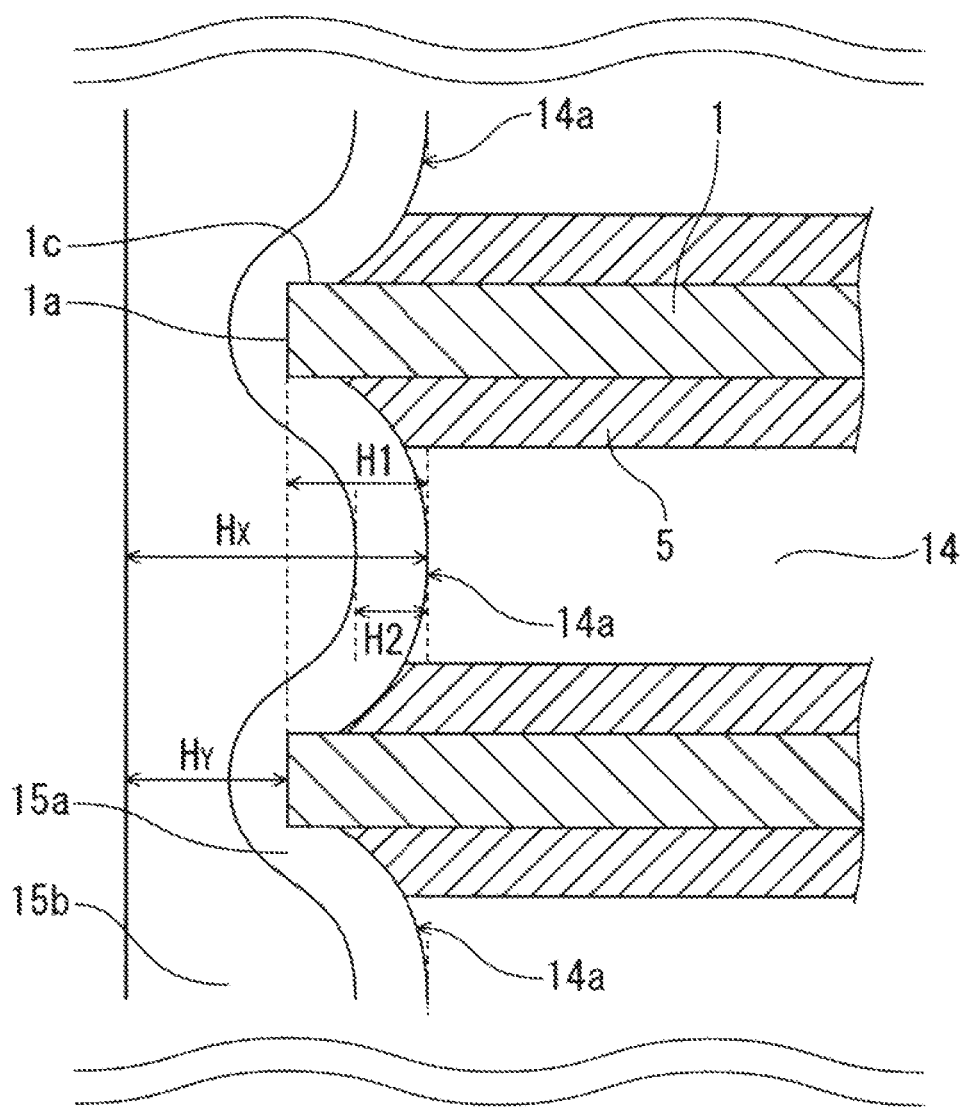
FIG. 2 is an enlarged sectional view schematically illustrating a first end of anode lead-out part and other components in a vicinity of the first end in the electrolytic capacitor according to the one exemplary embodiment of the present invention.

In order to securely join the anode lead-out part to the external electrode, preferably, a length of the first end that protrudes from an end surface of the exterior body is more than or equal to 0.2 mm. Meanwhile, the longer the first end protrudes, more difficult to make an outer surface of the external electrode flat. Thus, it is preferable that the first end has a length not protruding from the outer surface of the external electrode. In other words, it is preferable that a length of the first end that protrudes from the end surface of the exterior body is shorter than a total thickness of the external electrode (the total thickness of the external electrode corresponds to $H_X$ that will be described later and is illustrated in FIG. 2).

(Anode Foil)

The anode foil may include a valve metal, an alloy that contains a valve metal, and an intermetallic compound that contains a valve metal. The anode foil may include one of a valve metal, an alloy that contains a valve metal, and an intermetallic compound that contains a valve metal. Alternatively, the anode foil may include two or more of the valve metal, the alloy that contains a valve metal, and the intermetallic compound that contains a valve metal. Aluminum, tantalum, niobium, or titanium may be used as the valve metal.

A surface of the anode foil including at least the cathode forming part is roughened by, for example, etching so that a porous part is formed on a surface of the cathode forming part. The etching may be performed after a predetermined masking member is disposed on a surface of the anode lead-out part. Alternatively, a whole surface of the anode foil may be etched. When a whole surface of the anode foil is etched, the porous part is also formed on a surface of the anode lead-out part. The etching is performed using a publicly known technique, such as electrolytic etching. The masking member is not particularly limited. The masking member may be an insulator, such as resin, or may be a conductor that contains a conductive material.

(Dielectric Layer)

The dielectric layer is formed by anodizing a valve metal on a surface of the cathode forming part, for example. The dielectric layer contains an oxide of the valve metal. When aluminum is used as the valve metal, for example, the dielectric layer contains aluminum oxide. The dielectric layer is formed along an etched surface (the etched surface includes inner surfaces within holes of the porous part) of the cathode forming parts. Meanwhile, a method for forming the dielectric layer is not limited to the above method. Any method can be used if a layer that has an insulation property and functions as a dielectric is formed using the method on a surface of the cathode forming part. The dielectric layer may be formed on the porous part on a surface of the anode lead-out part.

The cathode part includes a solid electrolyte layer and a cathode lead-out layer. The solid electrolyte layer covers at least part of the dielectric layer. The cathode lead-out layer covers at least part of the solid electrolyte layer. Hereinafter, the solid electrolyte layer and the cathode lead-out layer will be described.

(Solid Electrolyte Layer)

The solid electrolyte layer contains a conductive polymer, for example. For example, polypyrrole, polythiophene, or polyaniline, or a derivative of polypyrrole, polythiophene, or polyaniline is used as the conductive polymer. The solid electrolyte layer can be formed by, for example, polymerizing raw material monomer on the dielectric layer through chemical polymerization and/or electrolytic polymerization. Alternatively, the solid electrolyte layer can be formed by applying a solution in which the conductive polymer is dissolved or a liquid in which the conductive polymer is dispersed to the dielectric layer. The solid electrolyte layer may contain a manganese compound.

(Cathode Lead-Out Layers)

The cathode lead-out layer include a carbon layer and a silver-paste layer. It is enough for the carbon layer to have electric conductivity. For example, the carbon layer is made of a conductive carbon material, such as graphite. The carbon layer is formed by, for example, applying a carbon paste to at least part of a surface of the solid electrolyte layer. A composition that contains, for example, a mixture of silver powder and a binder resin (e.g., an epoxy resin) may be used for the silver-paste layer. The silver-paste layer is formed by applying a silver paste to a surface of the carbon layer, for example. The cathode lead-out layers are not limited to the above configuration, but may have any configuration that has a function that collects electricity.

(Exterior Body)

The exterior body preferably contains a cured product of a curable resin composition. The exterior body may further contain a thermoplastic resin or a composition containing the thermoplastic resin.

The exterior body can be formed by using a molding technique such as injection molding, insert molding, or compression molding. The exterior body can be formed by, for example, filling the curable resin composition or the thermoplastic resin (composition) into a predetermined portion in a predetermined mold so that the curable resin composition or the thermoplastic resin (composition) covers the capacitor element.

The curable resin composition may contain a filler, a curing agent, a polymerization initiator, and/or a catalyst, in addition to a curable resin. The curable resin is a light-activated resin or a thermosetting resin, for example. The curing agent, the polymerization initiator, the catalyst, and the like are appropriately selected based on a type of the curable resin.

A method for exposing the first end of the anode lead-out part from the exterior body includes, for example, grinding a surface of the exterior body or cutting off part of the exterior body after covering the capacitor element with the exterior body so as to expose the first end from the exterior body. Preferably, the exterior body is cut by dicing. Consequently, an end face of the first end of the anode lead-out part is exposed from a surface of the exterior body that has been made by cutting the exterior body. Then part of the exterior body that is exposed is removed by abrasive blasting treatment, for example. Consequently, the first end of the anode lead-out part protrudes from the exterior body.

(External Electrode)

Preferably, the external electrode includes a first electrode layer and a second electrode layer disposed on a surface of the first electrode layer. The first electrode layer covers at least part of the first end and at least part of the exterior body.

Since the first electrode layer covers a surface of the first end exposed from the exterior body as well as part of a surface of the exterior body, natural oxide film is less likely to be produced on the first end. In view of suppressing production of the natural oxide film on the first end, it is preferable that the first electrode layer covers the exterior body so that the first electrode layer surrounds the surface of the first end that is exposed from the exterior body.

Preferably, the first electrode layer is a metal layer. The metal layer is a plated layer, for example. The metal layer contains at least one of nickel, copper, zinc, tin, silver, and gold, for example. To form the first electrode layer, a film forming technique, such as electroplating, electroless plating, sputtering, vacuum deposition, chemical vapor deposition (CVD), cold spraying, or thermal spraying, may be used. By using the above method, the first electrode layer is easily formed and is tightly joined to the first end and part of the exterior body.

The second electrode layer covers the first electrode layer. Thus, deterioration of the first electrode layer due to oxidation is suppressed. The exemplified materials of the first electrode layer are also used for the second electrode layer. Further, the second electrode layer can be formed by using one of the exemplified methods for forming the first electrode layer. In order to tightly join the second electrode layer to the first electrode layer, it is preferable that the second electrode layer is a conductive resin layer. For example, the conductive resin layer contains resin, and conductive materials dispersed in the resin. For example, the resin contains a cured product of a curable resin composition and/or a thermoplastic resin (a thermoplastic resin composition). For example, the conductive material includes at least one of silver, copper, and carbon.

Preferably, length H1 of the first end that protrudes from an end surface of the exterior body is greater than thickness H2 of the first electrode layer (see FIG. 2). Since the second electrode layer covers an uneven outer surface of the first electrode layer, adhesion of the second electrode layer to the first electrode layer is improved.

Figure 1:
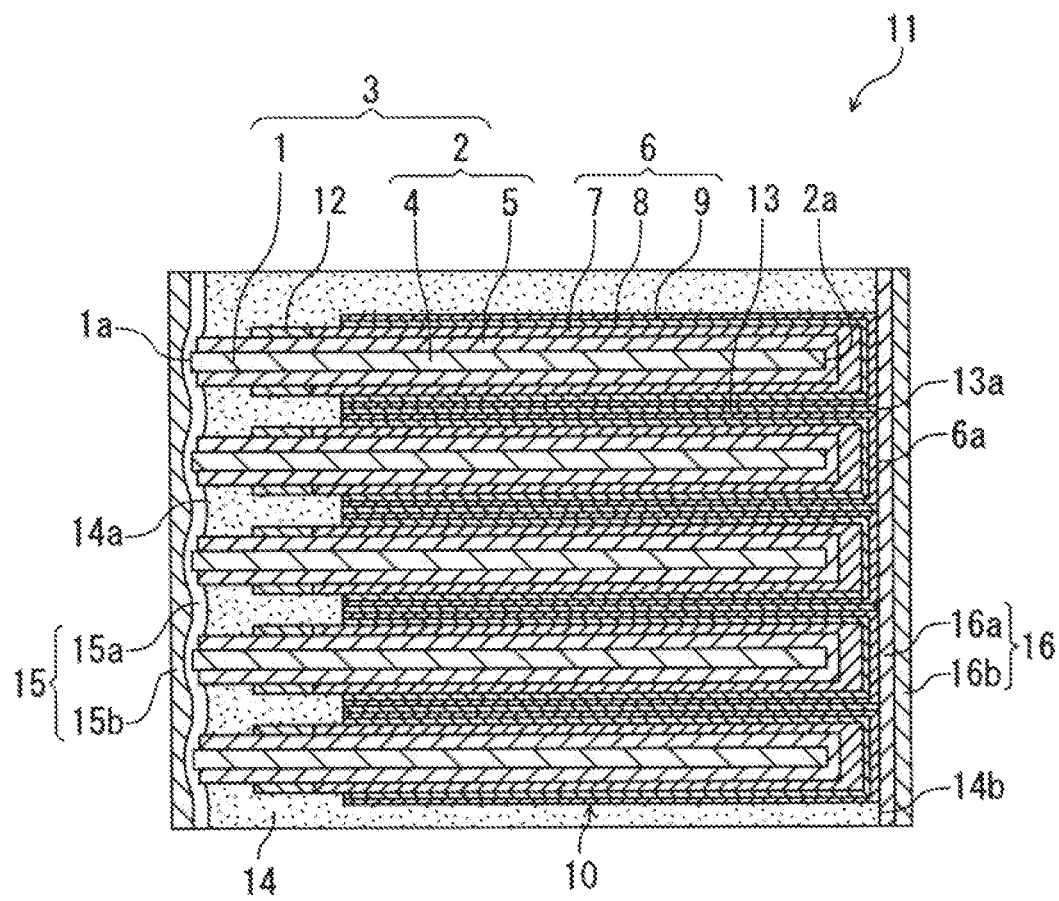
FIG. 1 is a sectional view schematically illustrating an electrolytic capacitor according to one exemplary embodiment of the present invention.

Hereinafter, an example of an electrolytic capacitor according to the present invention will be described with reference to FIG. 1. FIG. 1 is a sectional view that schematically illustrates a configuration of an electrolytic capacitor according to one exemplary embodiment of the present invention. The electrolytic capacitor according to the present invention is not limited to the example.

As illustrated in FIG. 1, electrolytic capacitor 11 includes a plurality of capacitor elements 10. Each of capacitor elements 10 includes anode foil 3. Anode foil 3 includes anode lead-out part 1 having first end 1a, and cathode forming part 2 having second end 2a. Cathode forming part 2 has core 4 and porous part 5. Porous part 5 formed by etching is disposed on a surface of core 4.

Each of capacitor elements 10 includes a dielectric layer (not illustrated) on a surface of cathode forming part 2 of anode foil 3. The dielectric layer is formed along a surface of porous part 5. At least part of the dielectric layer covers inner surfaces within holes of porous part 5, and is formed along the inner surfaces within holes of porous part 5.

In FIG. 1, porous part 5 is also formed, by etching, on a surface of anode lead-out part 1 of anode foil 3. Further, the dielectric layer is formed along a surface of porous part 5.

Each of capacitor elements 10 includes cathode part 6 that covers at least part of the dielectric layer. Cathode part 6 includes solid electrolyte layer 7 and a cathode lead-out layer. Solid electrolyte layer 7 covers at least part of the dielectric layer. The cathode lead-out layer covers at least part of solid electrolyte layer 7. The cathode lead-out layer includes carbon layer 8 and silver-paste layer 9. Carbon layer 8 covers at least part of solid electrolyte layer 7. Silver-paste layer 9 covers carbon layer 8. The dielectric layer has an uneven surface that conforms to a shape of a surface of porous part 5. Preferably, solid electrolyte layer 7 fills unevenness of the dielectric layer. In FIG. 1, cathode forming part 2 is part of anode foil 3 on which cathode part 6 is disposed via the dielectric layer. Further, anode lead-out part 1 is part of anode foil 3 on which cathode part 6 is not disposed.

Separation layer 12 having an insulation property is disposed to cover a part of a surface of anode foil 3 which does not face cathode part 6 and is adjacent to cathode part 6. Thus, cathode part 6 is restricted to be in contact with anode lead-out part 1. For example, separation layer 12 is a resin layer having an insulation property.

The plurality of capacitor elements 10 are stacked together so that the plurality of anode foils 3 face in a same direction and are stacked together. The plurality of capacitor elements 10 constitute an anode stacking section where anode lead-out parts 1 are stacked together, and a cathode stacking section where cathode parts 6 are stacked together. Cathode part 6 of one of the plurality of capacitor elements 10 is electrically connected, by adhesive layer 13 having electric conductivity, with cathode part 6 of another one of the plurality of capacitor elements 10 that is adjacent to the one of the plurality of capacitor elements 10 in a stacking direction. Adhesive layer 13 is formed by using conductive adhesive, for example. Adhesive layer 13 includes silver, for example.

Electrolytic capacitor 11 includes exterior body 14. Exterior body 14 seals the plurality of capacitor elements 10, and exposes the plurality of first ends 1a. Exterior body 14 substantially has a rectangular-prism shape. Electrolytic capacitor 11 also substantially has a rectangular-prism shape. Exterior body 14 has first side surface 14a and second side surface 14b. First side surface 14a is one of end surfaces of exterior body 14. Second side surface 14b is the other end surface that is opposite to first side surface 14a. The plurality of first ends 1a are exposed from first side surface 14a of exterior body 14.

Electrolytic capacitor 11 includes external electrode 15 for anode. External electrode 15 for anode is electrically connected with the plurality of first ends 1a exposed from exterior body 14. Since each of the plurality of first ends 1a exposed from exterior body 14 is electrically connected with external electrode 15 for anode, the plurality of anode lead-out parts 1 do not need to be tied together. Thus, each of the plurality of anode lead-out parts 1 does not need to have enough length for allowing the plurality of anode lead-out parts 1 to be tied together. Hence, a proportion of anode lead-out part 1 in the anode foil can be decreased compared with a case that a plurality of anode lead-out parts 1 are tied together. Accordingly, a capacitance per unit volume of the capacitor can be increased.

External electrode 15 for anode includes first electrode layer 15a for anode and second electrode layer 15b for anode. First electrode layer 15a for anode covers end surfaces of the plurality of first ends 1a exposed from exterior body 14, and covers first side surface 14a of exterior body 14. Second electrode layer 15b for anode is disposed on a surface of first electrode layer 15a for anode. The external electrode exemplified above is used as external electrode 15 for anode.

First side surface 14a of exterior body 14 has concave depressions due to removal of part of exterior body 14. Consequently, first ends 1a of anode lead-out parts 1 protrude from the exterior body. In a vicinity of first end 1a, porous parts 5 are removed from anode lead-out parts 1, and thus the core is exposed at top surface 1c of anode lead-out part 1 close to first end 1a (see FIG. 2). The exposed core and first end 1a are in direct contact with external electrode 15 (first electrode layer 15a) for anode. Due to unevenness formed by first side surface 14a and end surfaces of first ends 1a, first electrode layer 15a for anode has an uneven surface. On the other hand, second electrode layer 15b for anode that covers first electrode layer 15a for anode is formed to have an outer surface be flat.

FIG. 2 is an enlarged view illustrating a first end 1a and other components in a vicinity of the first end in FIG. 1. First end 1a protrudes toward the outer surface of second electrode layer 15b in a direction perpendicular to the outer surface of second electrode layer 15b. On the other hand, first side surface 14a has a concave depression.

The outer surface of second electrode layer 15b, which is formed to be flat, will be used as a reference plane. Position X is defined as a most distant position from the reference plane in first side surface 14a between anode lead-out parts 1 that are adjacent to each other (that is, position X is the deepest position in the depression). Position Y is defined as a closest position to the reference plane in an end surface of first end 1a. $H_X$ is defined as a distance from the reference plane to position X. $H_Y$ is defined as a distance from the reference plane to position Y. Length H1 of a protruding part of first end 1a of one of anode lead-out parts 1, which protrudes from first side surface 14a of exterior body 14, is defined as follows:

$$H1 = \min\{H_X\} - H_Y$$

When the plurality of anode lead-out parts 1 exist, first side surface 14a has a plurality of concave depressions. Thus, the plurality of positions X exist. In the definition of H1 described above, one of the plurality of positions X that is the closest to the reference plane is used.

Preferably, length H1 of the protruding part of first end 1a, which protrudes from first side surface 14a of exterior body 14, is more than or equal to 0.2 mm. In this case, the anode lead-out parts are securely joined to the external electrode.

Further, preferably, length H1 of the protruding part of first end 1a, which protrudes from first side surface 14a of exterior body 14, is greater than a thickness of first electrode layer 15a. The thickness of first electrode layer 15a is defined as thickness H2 of first electrode layer 15a at position X in a depression of first side surface 14a. When length H1 is greater than thickness H2 of first electrode layer 15a (H1>H2), first electrode layer 15a has an uneven outer surface (that is, the uneven outer surface is a surface to be covered by second electrode layer 15b) after first electrode layer 15a is formed on first side surface 14a of exterior body 14. Since first electrode layer 15a has an uneven surface, adhesion of second electrode layer 15b to first electrode layer 15a can be improved.

Electrolytic capacitor 11 includes external electrode 16 for cathode. External electrode 16 for cathode is electrically connected with cathode parts 6. More specifically, ends 6a of the plurality of cathode parts 6, which are close to respective second ends 2a, are exposed from exterior body 14. Further, ends 13a of the plurality of adhesive layers 13, which are close to respective second ends 2a, are exposed from exterior body 14. External electrode 16 for cathode is electrically connected with ends 6a of the plurality of cathode parts 6 and ends 13a of the plurality of adhesive layers 13, which are exposed from exterior body 14. The plurality of ends 6a and the plurality of ends 13a are exposed from second side surface 14b of exterior body 14. Further, end surfaces of the plurality of ends 6a and end surfaces of the plurality of ends 13a are flush with second side surface 14b.

External electrode 16 for cathode includes first electrode layer 16a for cathode, and second electrode layer 16b for cathode. First electrode layer 16a for cathode covers end surfaces of the plurality of ends 6a and the plurality of ends 13a, which are exposed from exterior body 14, and also covers second side surface 14b of exterior body 14. Second electrode layer 16b for cathode is disposed on a surface of first electrode layer 16a for cathode. An external electrode that can be used as the external electrode for anode can be used as the external electrode for cathode.

Each of ends 6a of the plurality of cathode parts 6 exposed from exterior body 14 are connected with external electrode 16. Thus, electrical resistance between the external electrode for cathode and each of the cathode parts can be low. Further, the external electrode for cathode is reliably connected with the cathode parts.

In the present exemplary embodiment, ends 13a of adhesive layers 13, which are close to respective second ends 2a, are exposed from exterior body 14. Meanwhile, ends 13a of adhesive layers 13, which are close to respective second ends 2a, may be covered by exterior body 14.

As another example of electrically connecting external electrode 16 for cathode with cathode parts 6, external electrode 16 for cathode may be electrically connected, via a conductive adhesive layer, with a principal surface (a surface that is perpendicular to a stacking direction of the plurality of capacitor elements) of one of two of the cathode parts that are the most distant from each other in the stacking direction. In this case, ends 13a and ends 6a are not exposed from the exterior body, but the principal surface of the one of the cathode parts is exposed from a side surface of the exterior body other than the first side surface.

[Method for Manufacturing Electrolytic Capacitor]

Hereinafter, steps of a method for manufacturing the electrolytic capacitor according to the exemplary embodiment of the present invention will be described.

(First step)

In first step, a capacitor element including an anode foil, a dielectric layer, and a cathode part is formed. The anode foil includes an anode lead-out part and a cathode forming part. The dielectric layer is disposed on the cathode forming part. The cathode part covers at least part of the dielectric layer. For example, the first step includes step a1 of roughening a surface of the anode foil, and step a2 of forming the dielectric layer on a roughened surface of the anode foil. In steps a1 and a2, the anode foil with the dielectric layer formed on the anode foil is formed. An anode lead-out part is a part of the anode foil that has one end (first end) of the anode foil. And a cathode forming part is a part of the anode foil that has the other end (second end) of the anode foil, which is opposite to the one end. In step a1, a surface of at least the cathode forming part of the anode foil is roughened. In step a2, the dielectric layer is formed on a surface of at least the cathode forming part of the anode foil. Since an external electrode is joined to an end surface of the anode lead-out part, a whole surface of the anode foil that includes a surface of the anode lead-out part may be roughened, and the dielectric layer may be formed on the whole surface of the anode foil that has been roughened.

Roughening a surface of the anode foil may be conducted by any method as long as it makes the surface of the anode foil uneven. For example, a surface of the anode foil may be roughened by etching the surface of the anode foil (for example, electrolytic etching).

The dielectric layer is formed by anodizing the anode foil. The anodizing is performed by a publicly known method, such as chemical conversion treatment. In anodizing, for example, an anode foil is immersed in an anodizing solution to impregnate a surface of the anode foil with the anodizing solution. Then, voltage is applied between the anode foil and a cathode immersed in the solution while the anode foil is used as an anode. Preferably, a phosphoric acid aqueous solution is used as the anodizing solution, for example.

When a surface of the anode foil has been roughened, the dielectric layer is formed so that the dielectric layer is formed along unevenness of the roughened surface of the anode foil. That is, a surface of the dielectric layer has unevenness that conform to a shape of the roughened surface of the anode foil.

Next, an insulation material (that corresponds to separation layer 12 in FIG. 1) is disposed on part of the anode foil. More specifically, the insulation material is disposed on the anode lead-out part of the anode foil directly or via the dielectric layer. The insulation material separates the anode lead-out part from a cathode part, which will be formed in a later step.

The insulation material may be disposed by pressing an insulation material having a sheet-like shape (for example, a resin tape) against the anode lead-out part to stick to the anode lead-out part. Alternatively, to make insulation components, a resin solution that is a raw-material solution may be applied to the anode lead-out parts. Alternatively, the insulation material may be disposed by applying a resin solution that is a raw-material solution to the anode lead-out part or impregnating the anode lead-out part with the resin solution. After the resin solution is applied to the anode lead-out part or the anode lead-out part is impregnated with the resin solution, the solvent may be removed by heat drying.

Subsequently, the cathode part is formed on part of the anode foil where the insulation material has not been disposed. Then, a capacitor element is formed. More specifically, the cathode part covers at least part of the dielectric layer that is disposed on a surface of the cathode forming part of the anode foil.

The step of forming the cathode part includes, for example, a step of forming a solid electrolyte layer that covers at least part of a dielectric layer, and a step of forming a cathode lead-out layer that cover at least part of the solid electrolyte layer.

The solid electrolyte layer is formed by, for example, polymerizing raw material monomers on the dielectric layer through chemical polymerization and/or electrolytic polymerization. Alternatively, the solid electrolyte layer is formed by applying a treatment liquid that contains a conductive polymer to the dielectric layer, and then drying the treatment liquid. The treatment liquid may also contain other ingredients, such as a dopant. For example, poly(3,4-ethylenedioxythiophene) (PEDOT) is used as the conductive polymer. For example, polystyrene sulfonic acid (PSS) is used as the dopant. The treatment liquid is a liquid in which the conductive polymer is dispersed, or a solution that contains the conductive polymer. The dispersion medium (solvent) is water, an organic solvent, or a mixture of water and an organic solvent, for example.

The cathode lead-out layer is formed by stacking a carbon layer and a silver-paste layer sequentially on the solid electrolyte layer.

(Second Step)

In a second step, the capacitor elements are covered with an exterior body. The exterior body is formed by using a molding technique, such as injection molding. The exterior body is formed by, for example, filling a curable resin composition or a thermoplastic resin (a thermoplastic resin composition) into a predetermined portion in a predetermined mold so that the curable resin composition or the thermoplastic resin (the thermoplastic resin composition) covers the capacitor elements.

The curable resin composition may contain a filler, a curing agent, a polymerization initiator, and/or a catalyst, in addition to a curable resin. The curable resin is a light-activated resin or a thermosetting resin, for example. The curing agent, the polymerization initiator, the catalyst, and the like are appropriately selected based on a type of the curable resin.

(Third Step)

In a third step, the exterior body is cut together with the anode lead-out part after the second step so as to form a first end having an end surface exposed from a cutting surface of the exterior body. Consequently, an end surface of the anode foil, which is flush with a side surface of the exterior body, is easily exposed from the exterior body.

In the third step, since the end surface of the anode foil (first end) is easily exposed from the exterior body, electrical resistance between the anode foil (the anode lead-out part) and the external electrode can be low. Further, the external electrode is reliably connected with the anode foil (the anode lead-out part).

(Fourth Step)

In a fourth step, part of the exterior body exposed at the cutting surface of the exterior body is removed. Thus, the first end protrudes from an end surface of the exterior body. Preferably, part of the exterior body is removed by abrasive blasting treatment. The exterior body is made of a material that is softer than core of the anode foil. Thus, exposed part of the exterior body is selectively removed by the abrasive blasting treatment. Consequently, the first end of the anode lead-out part protrudes from the end surface of the exterior body. The abrasive blasting treatment may include injecting powder of resin, ceramic, or metal onto the cutting surface of the exterior body.

In the first step, each of a surface of the anode lead-out part and a surface of the cathode forming part may be roughened. Further, the dielectric layer may be formed on the surface of the anode lead-out part. In this case, part of porous part (and the dielectric layer) that is exposed are selectively removed, and the first end of the anode lead-out part protrudes from the end surface of the exterior body. Thus, in a vicinity of the first end, there can be a portion that the porous part does not exist on and the core of the anode lead-out part is exposed.

(Fifth Step)

In a fifth step, the first end that protrudes from the exterior body is joined to the external electrode. Preferably, the external electrode for anode includes a first electrode layer for anode, and a second electrode layer for anode. Preferably, the step of forming the external electrode for anode includes a step of covering, with the first electrode layer, at least part of the first end that is exposed and protrudes from the exterior body as well as at least part of the end surface of the exterior body. And the step of forming the external electrode for anode includes further includes a step of forming the second electrode layer for anode on a surface of the first electrode layer for anode. The first electrode layer and the second electrode layer that are exemplified above can be used as the first electrode layer for anode and the second electrode layer for anode.

(Sixth Step)

Further, a sixth step of joining the cathode part to an external electrode for cathode may be performed. An external electrode that is exemplified as the external electrode for anode is also used as the external electrode for cathode.

In order to produce an electrolytic capacitor that has a configuration illustrated in FIG. 1, the external electrode for cathode may be joined to ends of the plurality of cathode parts that are exposed from the exterior body and are close to the respective second ends. Further, the external electrode for cathode may be joined to ends of a plurality of adhesive layers that are exposed from the exterior body and are close to the respective second ends. In this case, in the second step, the exterior body may be formed so that the ends of the plurality of cathode parts that are close to the respective second ends are exposed from the exterior body, and the ends of the plurality of adhesive layers that are close to the respective second ends are exposed from the exterior body.

Alternatively, after the first step and before the second step, the external electrode for cathode may be joined to a principal surface (a surface that is perpendicular to a stacking direction of the plurality of capacitor elements) of one of two of the cathode parts that are the most distant from each other in the stacking direction.

An electrolytic capacitor according to an aspect of the present invention has various applications where the electrolytic capacitor needs to seal capacitor elements well in humid atmospheres.

What is claimed is:

1. An electrolytic capacitor comprising:
    a capacitor element that includes:
        an anode foil that includes an anode lead-out part and a cathode forming part, the anode lead-out part having a first end of the anode foil, the cathode forming part having a second end of the anode foil;
        a dielectric layer disposed on a surface of the cathode forming part; and
        a cathode part that covers at least part of the dielectric layer;
    an exterior body that seals the capacitor element; and
    an external electrode, wherein:
    each of the anode lead-out part and the cathode forming part includes a core and a porous part disposed on a main surface of the core,
    the first end in the anode lead-out part protrudes from an end surface of the exterior body to form a protruding part that protrudes from the end surface of the exterior body,
    at least part of the first end is in contact with the external electrode, and
    the external electrode is in contact with three faces of the core of the anode lead-out part in the protruding part.

2. The electrolytic capacitor according to claim 1, wherein a length of the protruding part is more than or equal to 0.2 mm.

3. The electrolytic capacitor according to claim 1, wherein the external electrode includes a first electrode layer and a second electrode layer disposed on a surface of the first electrode layer, the first electrode layer covering at least part of the first end and at least part of the exterior body.

4. The electrolytic capacitor according to claim 1, wherein:
    the external electrode includes a first electrode layer and a second electrode layer disposed on a surface of the first electrode layer, the first electrode layer covering at least part of the first end and at least part of the exterior body, and
    a length of the protruding part is greater than a thickness of the first electrode layer.

5. The electrolytic capacitor according to claim 1, wherein the first end does not protrude from an outer surface of the external electrode.

6. A method for manufacturing an electrolytic capacitor, the method comprising:
    a first step of forming a capacitor element that includes: an anode foil including an anode lead-out part and a cathode forming part; a dielectric layer disposed on a surface of the cathode forming part; and a cathode part covering at least part of the dielectric layer;
    a second step of covering the capacitor element with an exterior body;
    a third step of cutting the exterior body together with the anode lead-out part to form a first end in the anode lead-out part, the first end having an end surface exposed from a cutting surface of the exterior body;
    a fourth step of allowing the first end to protrude from an end surface of the exterior body to form a protruding part that protrudes from the end surface of the exterior body by removing part of the exterior body exposed at the cutting surface of the exterior body; and
    a fifth step of joining the first end that protrudes from the exterior body to an external electrode, wherein:
        each of the anode lead-out part and the cathode forming part includes a core and a porous part disposed on a main surface of the core,
        in the fourth step, the porous part in the protruding part is removed, and
        in the fifth step, the external electrode is in contact with three faces of the core of the anode lead-out part in the protruding part.

7. The method for manufacturing an electrolytic capacitor according to claim 6, wherein in the fourth step, the part of the exterior body is removed by abrasive blasting treatment.

8. A method for manufacturing an electrolytic capacitor, the method comprising:
    a first step of forming a capacitor element that includes: an anode foil including an anode lead-out part and a cathode forming part; a dielectric layer disposed on a surface of the cathode forming part; and a cathode part covering at least part of the dielectric layer;
    a second step of covering the capacitor element with an exterior body;
    a third step of cutting the exterior body together with the anode lead-out part to form a first end in the anode lead-out part, the first end having an end surface exposed from a cutting surface of the exterior body;
    a fourth step of allowing the first end to protrude from an end surface of the exterior body by removing part of the exterior body exposed at the cutting surface of the exterior body; and
    a fifth step of joining the first end that protrudes from the exterior body to an external electrode,
    wherein, in the fourth step, the part of the exterior body is removed by abrasive blasting treatment.

9. The method for manufacturing an electrolytic capacitor according to claim 8, wherein:
    in the first step, each of a surface of the anode lead-out part and a surface of the cathode forming part is roughened to form a core and a porous part disposed on a main surface of the core in each of the anode lead-out part and the cathode forming part, and
    in the fourth step, at least part of a porous part in the anode lead-out part is removed in a vicinity of the first end.

* * * * *